(12) United States Patent
Chase et al.

(10) Patent No.: US 10,837,556 B2
(45) Date of Patent: Nov. 17, 2020

(54) PACKING FOR A WELL SERVICE PUMP

(71) Applicant: GARDNER DENVER PETROLEUM PUMPS LLC, Tulsa, OK (US)

(72) Inventors: John Chase, Deer Park, TX (US); Troy E. Wiegand, Fort Worth, TX (US)

(73) Assignee: FARDNER DENVER PETROLEUM PUMPS LLC, Tulsa, OK (US)

( * ) Notice: Subject to any disclaimer, the term of this patent is extended or adjusted under 35 U.S.C. 154(b) by 124 days.

(21) Appl. No.: 15/710,574

(22) Filed: Sep. 20, 2017

(65) Prior Publication Data
US 2019/0085978 A1  Mar. 21, 2019

(51) Int. Cl.
F16J 15/18 (2006.01)
F04B 53/02 (2006.01)
E21B 21/00 (2006.01)

(52) U.S. Cl.
CPC ............. F16J 15/184 (2013.01); F04B 53/02 (2013.01); F16J 15/18 (2013.01); E21B 21/00 (2013.01)

(58) Field of Classification Search
CPC F16J 15/181; F16J 15/183; F16J 15/26; F16J 15/28; F16J 15/30; F16J 15/18
See application file for complete search history.

(56) References Cited

U.S. PATENT DOCUMENTS

| | | |
|---|---|---|
| 3,013,830 A | 12/1961 | Milligan |
| 3,419,280 A | 12/1968 | Wheeler |
| 3,469,854 A | 9/1969 | Linwood |
| 4,214,761 A | 7/1980 | Pippert |
| 4,283,062 A * | 8/1981 | Catanzaro ............... B29C 45/17 277/520 |
| 4,398,731 A * | 8/1983 | Gorman ................... F16J 15/22 277/529 |
| 4,440,404 A | 4/1984 | Roach et al. |
| 4,527,806 A * | 7/1985 | Ungchusri .............. F16K 41/04 277/530 |
| 4,811,959 A | 3/1989 | Bullard et al. |
| 4,886,241 A * | 12/1989 | Davis ..................... F16J 15/166 251/214 |

(Continued)

OTHER PUBLICATIONS

Abrams et al., "A User's Approach to Qualification of Dynamic Seals for Sour-Gas Environments," Society of Petroleum Engineers, 1990, vol. 5, Issue 3, pp. 217-220.

(Continued)

Primary Examiner — Kristina R Fulton
Assistant Examiner — L. Susmitha Koneru
(74) Attorney, Agent, or Firm — Michael Best & Friedrich LLP

(57) ABSTRACT

A packing arrangement for a fluid end of a reciprocating pump is received within a packing box and is arranged to form a seal with a plunger. The packing arrangement includes a plurality of separate annular rings arranged in an abutting relationship with one another within the packing box, and a header ring disposed within the plurality of separate annular rings, the header ring including an inner surface that is non-cylindrical and that is arranged to abut the plunger, a high pressure side that is arranged in a female chevron shape, and a low pressure side opposite the high pressure side. A packing nut is engaged with the fluid end and operable to compress the header ring and the plurality of separate annular rings within the packing box.

20 Claims, 4 Drawing Sheets

(56) References Cited

U.S. PATENT DOCUMENTS

| | | | |
|---|---|---|---|
| 5,131,666 A * | 7/1992 | Hutchens | F16J 15/166 |
| | | | 251/214 |
| 5,137,083 A | 8/1992 | Bump | |
| 5,478,048 A * | 12/1995 | Salesky | F16J 15/30 |
| | | | 251/214 |
| 5,549,276 A * | 8/1996 | Pittman | F16J 15/20 |
| | | | 251/214 |
| 5,615,896 A | 4/1997 | Morvant | |
| D384,727 S | 10/1997 | Yamaguchi | |
| 6,257,850 B1 | 7/2001 | Conn | |
| D515,675 S | 2/2006 | Tremoulet, Jr. et al. | |
| 7,284,602 B2 | 10/2007 | Tessier et al. | |
| D572,348 S | 7/2008 | Arosio | |
| D574,934 S | 8/2008 | Darce et al. | |
| D598,988 S | 8/2009 | Jaccoby et al. | |
| D607,091 S | 12/2009 | Weston | |
| D610,176 S | 2/2010 | Nagamine et al. | |
| D614,272 S | 4/2010 | Henry et al. | |
| D633,991 S | 3/2011 | Nakagawa | |
| D638,522 S | 5/2011 | Yoshida et al. | |
| D638,523 S | 5/2011 | Yoshida et al. | |
| D643,863 S | 8/2011 | Barnes et al. | |
| D646,764 S | 10/2011 | Rusconi | |
| D658,693 S | 5/2012 | Suzuki et al. | |
| D659,175 S | 5/2012 | Fujikata et al. | |
| 9,534,691 B2 | 1/2017 | Miller et al. | |
| 9,845,801 B1 | 12/2017 | Shek | |
| D810,705 S | 2/2018 | Krishnan et al. | |
| D871,609 S | 12/2019 | Isozaki et al. | |
| 2010/0008804 A1 | 1/2010 | Liska | |
| 2014/0125012 A1 | 5/2014 | Lee | |

OTHER PUBLICATIONS

Parker Hannifin Corp., "PTFE Seal Design Guide," <http://www.ceetak.com/wp-content/uploads/2015/05/Parker-PTFE-Seal-Design-Guide-PDE3354gb.pdf> webpage available at least as early as Sep. 6, 2015.

Utex Industries, Inc., "Plunger Packing," <http://www.utexind.com/wp-content/uploads/brochures/PlungerPacking.pdf> webpage available at least as early as Jun. 15, 2016.

James Walker, "Hydraulic Sealing Guide," 2011, Issue 28.1, pp. 18-28, 84.

Notice of Allowance from the United States Patent Office for U.S. Appl. No. 29/618,328 dated May 12, 2020 (11 pages).

* cited by examiner

PACKING FOR A WELL SERVICE PUMP

BACKGROUND

High pressure reciprocating pumps are often used to deliver high pressure fluids during earth drilling operations. A sealing arrangement is provided between a pump casing and a reciprocating plunger to reduce the likelihood of leakage and to protect the plunger from potential damage from any abrasive components that may be contained in the fluid being pumped.

BRIEF SUMMARY

In one construction, a packing arrangement for a fluid end of a reciprocating pump is received within a packing box and is arranged to form a seal with a plunger. The packing arrangement includes a first ring positioned at a high pressure end of the packing box, a last ring positioned at a low pressure end of the packing box, and a header ring disposed between the first ring and the last ring, the header ring including an inner surface that is non-cylindrical and arranged to contact the plunger and a female chevron portion facing the high pressure end of the packing box.

In another construction, a packing arrangement for a fluid end of a reciprocating pump is received within a packing box and is arranged to form a seal with a plunger. The packing arrangement may include a junk ring positioned at a high pressure end of the packing box, a first support ring positioned downstream of and abutting the junk ring, a first pressure ring positioned downstream of and abutting the first support ring, and a header ring positioned downstream of and abutting the first pressure ring, the header ring including an inner surface that is non-cylindrical and that is arranged to abut the plunger. A second pressure ring is positioned downstream of and abuts the header ring, a second support ring is positioned downstream of and abuts the second pressure ring, a lantern ring is positioned downstream of and abuts the second support ring, and a packing nut is threadably engaged with the fluid end and is movable to compress the junk ring, the first support ring, the first pressure ring, the header ring, the second pressure ring, the second support ring, and the lantern ring within the packing box.

In yet another construction, a packing arrangement for a fluid end of a reciprocating pump is received within a packing box and is arranged to form a seal with a plunger. The packing arrangement includes a plurality of separate annular rings arranged in an abutting relationship with one another within the packing box, and a header ring disposed within the plurality of separate annular rings, the header ring including an inner surface that is non-cylindrical and that is arranged to abut the plunger, a high pressure side that is arranged in a female chevron shape, and a low pressure side opposite the high pressure side. A packing nut is engaged with the fluid end and operable to compress the header ring and the plurality of separate annular rings within the packing box.

Other aspects of the invention will become apparent by consideration of the detailed description and accompanying drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
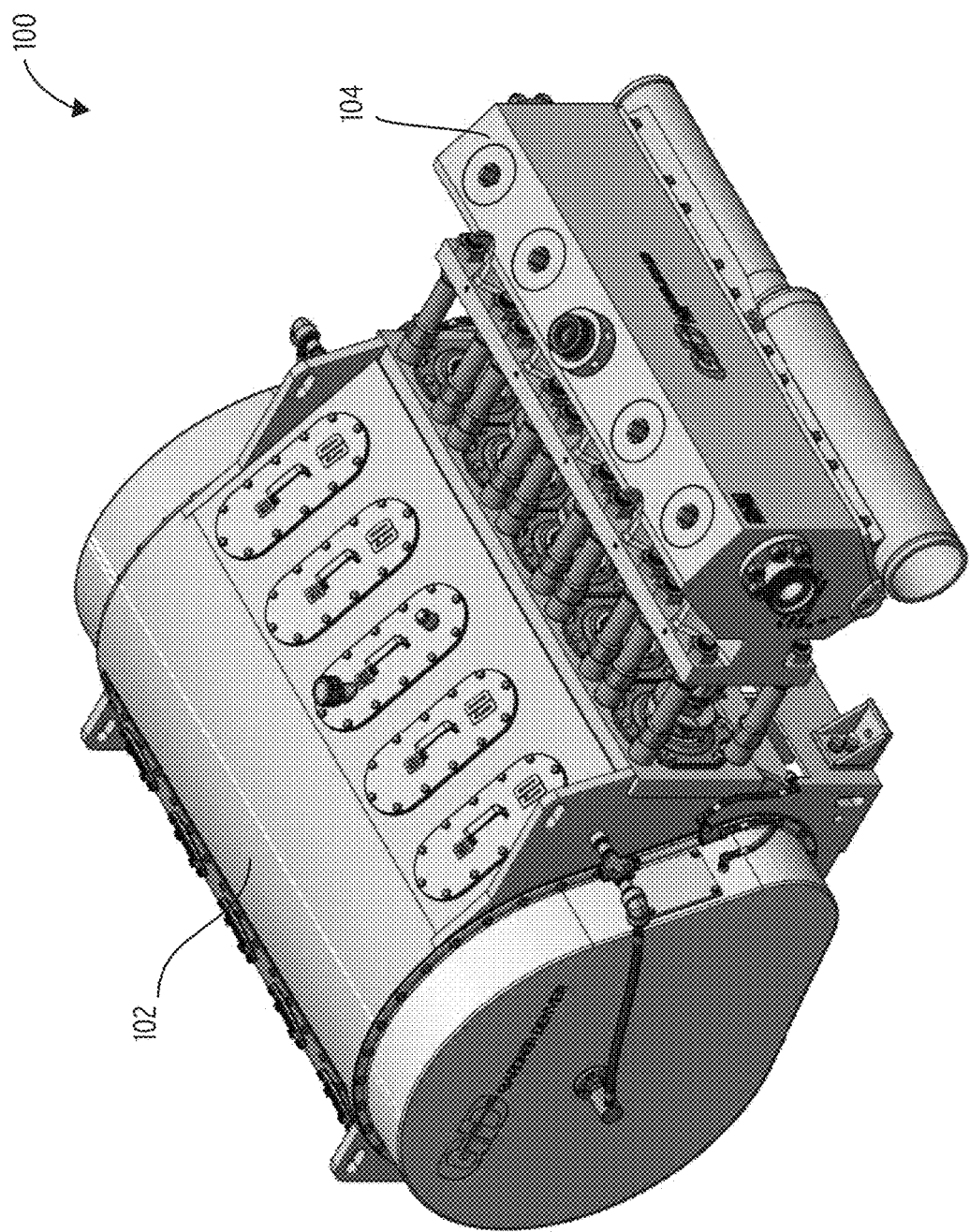
FIG. 1 is a perspective view of a reciprocating pump including a fluid end.

FIG. 1 illustrates a reciprocating pump 100 including a power end 102 and a fluid end 104. The power end 102 includes a crankshaft that drives a plurality of reciprocating plungers within the fluid end 104 to pump fluid at high pressure.

Figure 2:
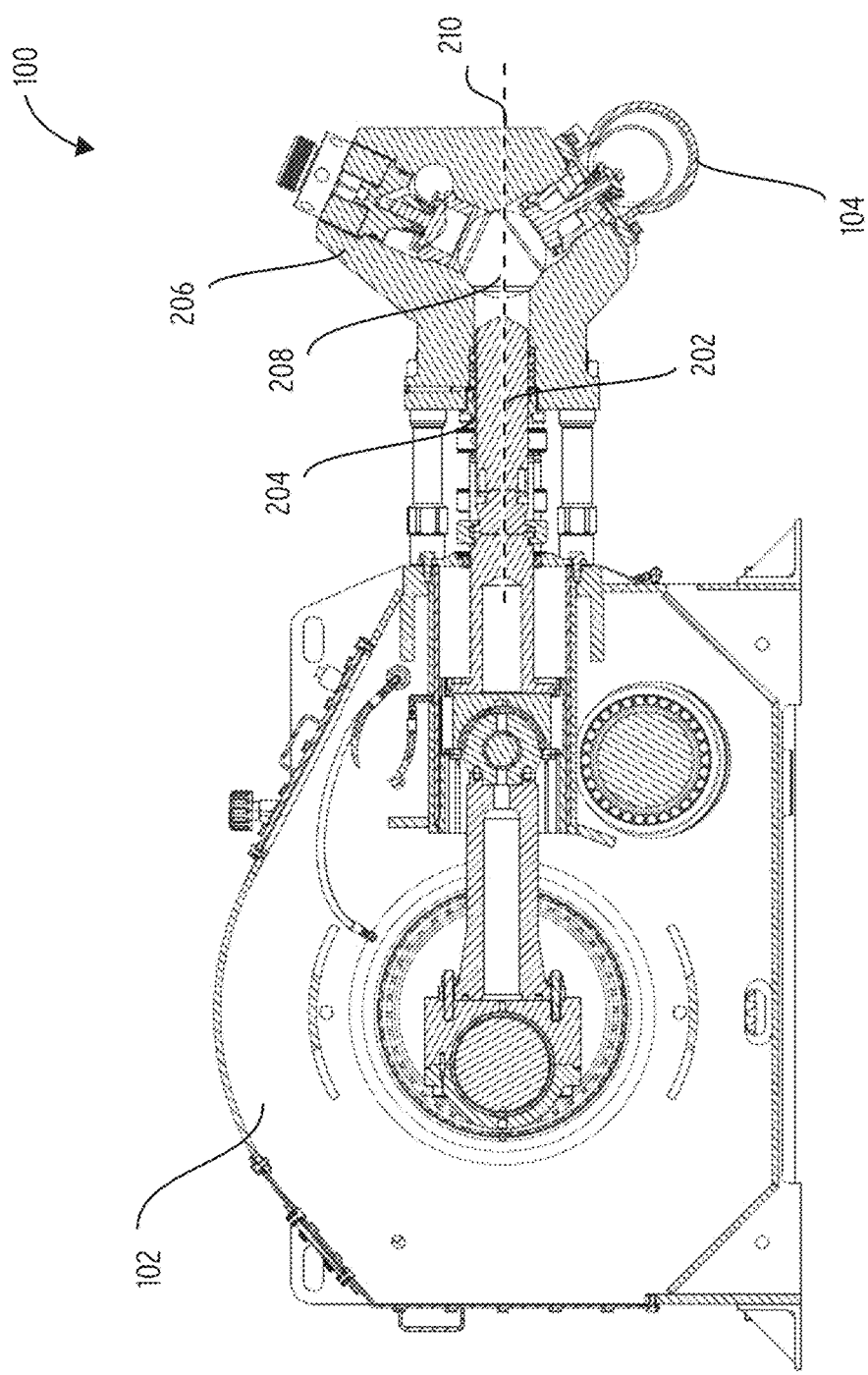
FIG. 2 is a section view of the reciprocating pump of FIG. 1.

FIG. 2 is a section view taken through the central or plunger axis 210 of one of the plungers 202. Each of the pumping chambers 208 of the reciprocating pump 100 includes a plunger 202 that reciprocates within a casing 206 of the fluid end 104. With each stroke of the plunger 202, low pressure fluid is drawn into the pumping chamber 208 and high pressure fluid is discharged.

A packing arrangement 204 is positioned between the casing 206 and the plunger 202 to form a seal therebetween. The fluid within the pumping chamber 208 often contains abrasive material that can damage the packing arrangement 204 and the plunger 202 if not sealed properly.

Figure 3:
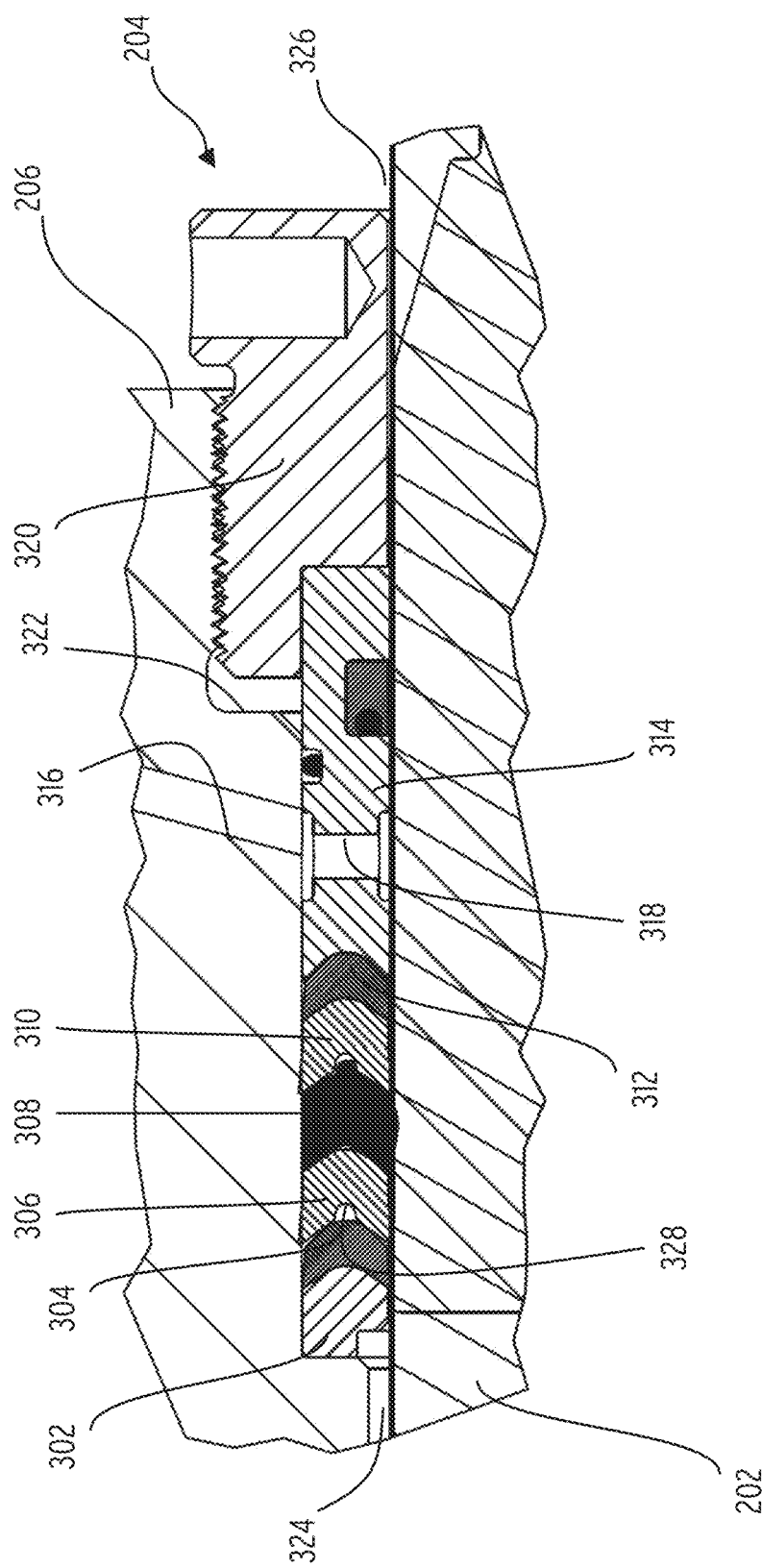
FIG. 3 is an enlarged view of the packing arrangement.

As illustrated in FIG. 3 the packing arrangement 204 is disposed within a pack packing box 322 that is formed as part of the casing 206 of the fluid end 104. The packing arrangement 204 includes a junk ring 302, a first support ring 304, a first pressure ring 306, a header ring 308, a second pressure ring 310, a second support ring 312, a lantern ring 314, and a packing nut 320.

Before discussing the packing arrangement in detail it is important to understand the terms "upstream" and "downstream". Any flow through the packing arrangement 204 or between the packing arrangement 204 and the plunger 202 flows from a high pressure side of the packing box 322 to a low pressure side adjacent the packing nut 320. Thus, upstream would be in the direction away from the packing nut 320 while downstream would be in a direction toward the packing nut 320.

The junk ring 302 is positioned within the packing box 322 adjacent the high pressure end 324 and is preferably made of a hard material such as steel. The junk ring 302 is annular in shape with a cylindrical inside surface and a cylindrical outside surface. The junk ring 302 includes a planar lead surface that abuts a planar surface that defines the high pressure end 324 of the packing box 322. Opposite the planar surface is a male chevron portion that faces toward the low pressure end 326 of the packing box 322.

The first support ring 304 is annular in shape and includes a cylindrical inner surface that abuts the plunger 202 and a cylindrical outer surface that abuts the wall of the packing box 322. The first support ring 304 also includes a female chevron portion that faces the high pressure end 324 and abuts the male chevron portion of the junk ring. A male chevron portion is positioned opposite the female chevron portion and faces toward the low pressure end 326. In preferred constructions, the first support ring 304 is manufactured from a material such as polyether ether ketone (PEEK).

The first pressure ring 306 is an annular ring that includes a cylindrical inner surface that abuts the plunger 202 and a cylindrical outer surface that abuts the bore of the packing box 322. A high pressure side of the first pressure ring 306 includes a female chevron portion arranged to receive the male chevron portion of the first support ring 304. An aperture 328 is formed in the female chevron portion and provides a relief should the arms of the female chevron portion be forced apart. A male chevron portion, opposite the female portion extends toward the low pressure end 326 of the packing box 322. In preferred constructions, the first pressure ring 306 is formed from an elastomer impregnated aramid fabric.

The second pressure ring 310 is identical to the first pressure ring 306 and the second support ring 312 is identical to the first support ring 304.

The header ring 308 is positioned between the first pressure ring 306 and the second pressure ring 310 and will be discussed in greater detail with regard to FIG. 4. The second support ring 312 is positioned on the low pressure side of the second pressure ring 310.

The lantern ring 314 is an elongated annular ring that includes an inner cylindrical surface that abuts the plunger and an outer cylindrical surface that abuts the surface of the packing box 322. The high pressure side of the lantern ring 314 includes a female chevron portion that is arranged to receive the male chevron portion of the second support ring 312. One or more lube oil bores 318 pass between the inner surface and the outer surface and provide a flow path for lube oil that is delivered to the packing arrangement 204 via the lube oil passage 316. In preferred constructions, the lantern ring 314 is formed from a metal such as aluminum or bronze.

The packing nut 320 threadably engages the casing 206 and is movable between a first position and a second position in which the packing nut 320 compresses the lantern ring 314 against the stack including the second support ring 312, the second pressure ring 310, the header ring 308, the first pressure ring 306, the first support ring 304, and the junk ring 302.

Figure 4:
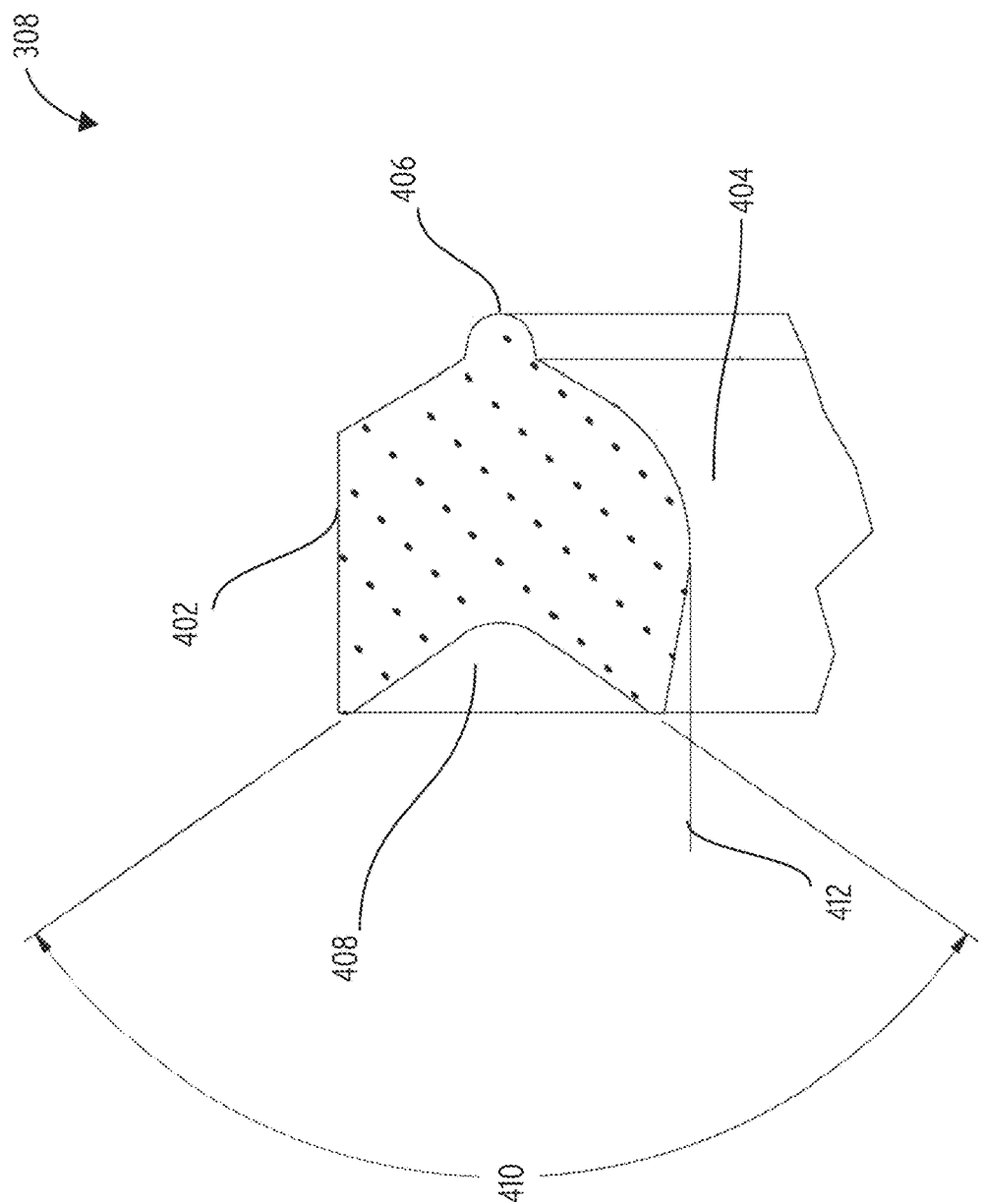
FIG. 4 is an enlarged cross section of the header ring of FIG. 3 taken along a plane that is parallel to the plunger axis.

As illustrated in FIG. 4 the header ring 308 includes a cylindrical outer surface 402 sized to abut the surface of the packing box 322. An inner surface 404 defines a minimum inside diameter 412 that is preferably smaller then the outside diameter of the plunger 202 to assure solid contact with the plunger 202 to improve the seal. The inner surface 404 is non-cylindrical and is defined by the revolution of a curved line about the center line of the header ring 308.

A low pressure side of the header ring 308 includes a male chevron portion and a knob portion 406 extending from the male chevron portion toward the low pressure end 326 of the packing box 322. The knob portion 406 is sized to be received in the aperture 328 of the second pressure ring 310 when the packing arrangement 204 is assembled.

A high pressure side of the header ring 308 includes a female chevron portion 408 sized to engage the male chevron portion of the first pressure ring 306. The female chevron portion 408 defines an included angle 410 between 90 degrees and 130 degrees with a preferred angle of 110 degrees.

In operation, and with reference to FIG. 3 the packing arrangement 204 is assembled in the packing box 322 by stacking, in order, the junk ring 302, the first support ring 304, the first pressure ring 306, the header ring 308, the second pressure ring 310, the second support ring 312, and the lantern ring 314. The packing nut 320 is then threaded to the casing 206 and tightened to provide the desired compression of the stacked components. As the components are compressed in the direction of the piston axis, they expand radially to better contact the outer wall or bore of the packing box 322 and the outer surface of the plunger 202.

Lube oil can be provided to the packing arrangement 204 via the lube oil passage 316 and the lube oil bore 318. The lube oil creates a pressure seal that enhances the function of the packing arrangement 204 while provided lubrication between the plunger 202 and the packing arrangement 204.

While the description and drawings illustrate a particular arrangement of the various seal rings, other constructions may re-order the rings as necessary to achieve the desired seal.

Various features and advantages of the invention are set forth in the following claims.

What is claimed is:

1. A packing arrangement for a fluid end of a reciprocating pump, the packing arrangement received within a packing box and arranged to form a seal with a plunger, the packing arrangement comprising:
    a first ring positioned at a high pressure end of the packing box;
    a last ring positioned at a low pressure end of the packing box; and
    a header ring disposed between the first ring and the last ring, the header ring including an inner surface that is non-cylindrical and arranged to contact the plunger and a female chevron portion facing the high pressure end of the packing box.

2. The packing arrangement of claim 1, wherein the first ring comprises a cylindrical inner surface in contact with the plunger, a female chevron portion facing the high pressure end of the packing box and a male chevron portion facing the low pressure end of the packing box.

3. The packing arrangement of claim 1, wherein the header ring comprises a male chevron portion facing the low pressure end of the packing box.

4. The packing arrangement of claim 3, wherein the male chevron portion of the header ring includes a knob portion that extends toward the low pressure end of the packing box.

5. The packing arrangement of claim 4, further comprising a pressure ring disposed downstream of the header ring, the pressure ring including a female chevron portion that engages the male chevron portion of the header ring, the pressure ring further comprising an aperture sized to receive the knob portion.

6. The packing arrangement of claim 5, further comprising a packing nut threadably engaged with the fluid end and movable to compress the first ring, the header ring, the pressure ring, and the last ring.

7. The packing arrangement of claim 1, wherein the female chevron portion of the header ring defines an included angle between 90 degrees and 130 degrees.

8. A packing arrangement for a fluid end of a reciprocating pump, the packing arrangement received within a packing box and arranged to form a seal with a plunger, the packing arrangement comprising:
  a junk ring positioned at a high pressure end of the packing box;
  a first support ring positioned downstream of and abutting the junk ring; a first pressure ring positioned downstream of and abutting the first support ring;
  a header ring positioned downstream of and abutting the first pressure ring, the header ring including an inner surface that is non-cylindrical and that is arranged to abut the plunger and a female chevron portion facing the high pressure end of the packing box;
  a second pressure ring positioned downstream of and abutting the header ring; a second support ring positioned downstream of and abutting the second pressure ring;
  a lantern ring positioned downstream of and abutting the second support ring; and a packing nut threadably engaged with the fluid end and movable to compress the junk ring, the first support ring, the first pressure ring, the header ring, the second pressure ring, the second support ring, and the lantern ring within the packing box,
  wherein the packing arrangement is progressively harder from the first support ring to the high pressure end.

9. The packing arrangement of claim 8, wherein the junk ring comprises a planar surface facing the high pressure end of the packing box and a male chevron portion facing a low pressure end of the packing box.

10. The packing arrangement of claim 9, wherein the first support ring, the second support ring, the first pressure ring, and the second support ring are chevron shaped such that each includes a female chevron portion that faces the high pressure end of the packing box and a male chevron portion that faces the low pressure end of the packing box.

11. The packing arrangement of claim 8, wherein the header ring comprises a female chevron portion that faces the high pressure end of the packing box and a male chevron portion that faces the low pressure end of the packing box.

12. The packing arrangement of claim 11, wherein the male chevron portion of the header ring includes a knob portion that extends toward the low pressure end of the packing box.

13. The packing arrangement of claim 12, wherein the second pressure ring includes an aperture sized to receive the knob portion.

14. The packing arrangement of claim 11, wherein the female chevron portion of the header ring defines an included angle between 90 degrees and 130 degrees.

15. The packing arrangement of claim 14, wherein the packing arrangement is progressively harder from the second support ring to the lantern ring.

16. A packing arrangement for a fluid end of a reciprocating pump, the packing arrangement received within a packing box and arranged to form a seal with a plunger, the packing arrangement comprising:
  a plurality of separate annular rings arranged in an abutting relationship with one another within the packing box;
  a header ring disposed within the plurality of separate annular rings, the header ring including an inner surface that is non-cylindrical and that is arranged to abut the plunger, a high pressure side that is arranged in a female chevron shape, and a low pressure side opposite the high pressure side; and
  a packing nut engaged with the fluid end and operable to compress the header ring and the plurality of separate annular rings within the packing box.

17. The packing arrangement of claim 16, wherein the low pressure side of the header ring includes a male chevron portion that extends toward a low pressure end of the packing box.

18. The packing arrangement of claim 17, wherein the male chevron portion of the header ring includes a knob portion that extends toward the low pressure end of the packing box.

19. The packing arrangement of claim 16, wherein the high pressure side of the header ring defines an included angle between 90 degrees and 130 degrees.

20. The packing arrangement of claim 19, wherein the included angle is 110 degrees.

* * * * *

UNITED STATES PATENT AND TRADEMARK OFFICE
CERTIFICATE OF CORRECTION

| | | |
|---|---|---|
| PATENT NO. | : 10,837,556 B2 | Page 1 of 1 |
| APPLICATION NO. | : 15/710574 | |
| DATED | : November 17, 2020 | |
| INVENTOR(S) | : John Chase et al. | |

It is certified that error appears in the above-identified patent and that said Letters Patent is hereby corrected as shown below:

On the Title Page

Change item (73) "FARDNER DENVER PETROLEUM PUMPS LLC, Tulsa, OK (US)" to --GARDNER DENVER PETROLEUM PUMPS LLC, Tulsa, OK (US)--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*